(12) United States Patent  
White et al.

(10) Patent No.: US 11,173,424 B2
(45) Date of Patent: Nov. 16, 2021

(54) SAND REMOVAL TANK

(71) Applicant: KBK Industries, LLC, Rush Center, KS (US)

(72) Inventors: Steven White, Rush Center, KS (US); Jesse Mueller, Rush Center, KS (US)

(73) Assignee: KBK Industries, LLC, Rush Center, KS (US)

( * ) Notice: Subject to any disclaimer, the term of this patent is extended or adjusted under 35 U.S.C. 154(b) by 0 days.

(21) Appl. No.: 16/669,904

(22) Filed: Oct. 31, 2019

(65) Prior Publication Data
US 2020/0282338 A1 Sep. 10, 2020

Related U.S. Application Data

(60) Provisional application No. 62/815,877, filed on Mar. 8, 2019.

(51) Int. Cl.
| B01D 21/02 | (2006.01) |
| B01D 21/24 | (2006.01) |
| B01D 17/02 | (2006.01) |
| B01D 21/26 | (2006.01) |

(52) U.S. Cl.
CPC ......... B01D 21/10 (2013.01); B01D 17/0214 (2013.01); B01D 17/0217 (2013.01); B01D 21/2411 (2013.01); B01D 21/2444 (2013.01); B01D 21/2472 (2013.01); B01D 21/267 (2013.01)

(58) Field of Classification Search
CPC .. B01D 21/0012; B01D 21/267; B01D 21/10; B01D 21/2411; B01D 21/2444; B01D 17/0217; B01D 17/0214; B01D 21/2472; B01D 2221/04; B01D 21/2427; B01D 21/2494; B01D 19/0057; G01G 21/22; B03D 1/1431; B03D 1/245; B03D 2203/008; B03D 1/1462
USPC .......................................................... 210/788
See application file for complete search history.

(56) References Cited

U.S. PATENT DOCUMENTS

| 2,998,096 | A | * | 8/1961 | Snipes | B01D 17/0214 |
| | | | | | 96/161 |
| 3,247,651 | A | * | 4/1966 | Hutchings | B04C 3/04 |
| | | | | | 55/345 |
| 3,421,622 | A | * | 6/1969 | Wurtmann | D21D 5/26 |
| | | | | | 209/731 |
| 3,473,300 | A | * | 10/1969 | Wilm et al. | B01D 45/12 |
| | | | | | 55/302 |
| 4,120,795 | A | | 10/1978 | Laval, Jr. | |
| 5,059,066 | A | * | 10/1991 | Schindler | B01D 21/0093 |
| | | | | | 405/210 |
| 5,073,266 | A | | 12/1991 | Ball, IV | |

(Continued)

OTHER PUBLICATIONS

U.S. Appl. No. 16/253,973, Ball IV, filed Jan. 22, 2019.

Primary Examiner — Claire A Norris
Assistant Examiner — Ekandra S. Miller-Cruz
(74) Attorney, Agent, or Firm — Leydig, Voit & Mayer, Ltd.

(57) ABSTRACT

A tank for removing sand entrained in a flow includes an inlet assembly including churn tubes configured to receive fluid provided into the tank such that sand is separated from water, gas and oil present in the flow. An oil outlet port communicates with an oil collection device, and a water outlet port communicates with a water outlet assembly.

19 Claims, 3 Drawing Sheets

(56) References Cited

U.S. PATENT DOCUMENTS

| | | | |
|---|---|---|---|
| 5,456,837 A * | 10/1995 | Peachey | B01D 17/0217 210/512.2 |
| 5,711,374 A | 1/1998 | Kjos | |
| 5,827,357 A * | 10/1998 | Farion | B01D 17/0217 210/788 |
| 6,082,452 A * | 7/2000 | Shaw | B01D 17/0211 210/801 |
| 6,228,148 B1 | 5/2001 | Aaltonen et al. | |
| 6,250,473 B1 | 6/2001 | Golightley et al. | |
| 6,328,118 B1 * | 12/2001 | Karigan | B01D 21/267 210/512.2 |
| 6,336,503 B1 * | 6/2002 | Alhanati | B01D 17/10 210/800 |
| 6,872,239 B2 * | 3/2005 | Nilsen | B01D 17/0208 95/30 |
| 7,147,788 B2 * | 12/2006 | Tveiten | B04C 5/26 210/788 |
| 7,374,668 B1 | 5/2008 | DiValentin et al. | |
| 7,678,285 B2 * | 3/2010 | Olofsson | B01D 17/10 210/800 |
| 8,221,633 B2 * | 7/2012 | Lam | B01D 17/0217 210/788 |
| 8,226,820 B1 | 7/2012 | Wegner | |
| 8,257,588 B2 | 9/2012 | Mori et al. | |
| 8,747,679 B2 * | 6/2014 | Sarshar | B04C 7/00 210/788 |
| 9,010,440 B2 * | 4/2015 | Rodger | E21B 43/34 166/369 |
| 9,199,251 B1 * | 12/2015 | Ball, IV | B01D 21/267 |
| 9,630,126 B1 * | 4/2017 | Ball | B01D 17/0214 |
| 9,656,276 B1 * | 5/2017 | Ball, IV | B01D 19/0057 |
| 9,765,265 B2 | 9/2017 | Ball, IV | |
| 9,782,696 B2 * | 10/2017 | Goriawala | B01D 21/0006 |
| 2006/0000608 A1 * | 1/2006 | Surjaatmadja | B01D 17/0214 166/265 |
| 2010/0269696 A1 | 10/2010 | Sarshar et al. | |
| 2012/0006762 A1 * | 1/2012 | McCabe | B01D 17/0211 210/801 |
| 2013/0083620 A1 | 4/2013 | Hypes et al. | |
| 2013/0299419 A1 * | 11/2013 | Nickson | B01D 21/267 210/512.2 |
| 2014/0275690 A1 | 9/2014 | Hernandez et al. | |

* cited by examiner

SAND REMOVAL TANK

CROSS-REFERENCE TO RELATED APPLICATIONS

This patent application claims the benefit of U.S. Provisional Patent Application No. 62/815,877, filed Mar. 8, 2019, which is incorporated by reference.

FIELD OF THE DISCLOSURE

The disclosure relates to separation tanks and, more particularly, to a tank for separating sand from a mixture of water and oil.

BACKGROUND OF THE DISCLOSURE

Fluid streams of oil production fields often contain a variety of components, including sand and silt from fracturing operations, drilling fines, formation fines, water, oil, and gases. It is desirable to remove the sand and gases from the liquid stream prior to separating the oil from the water. The separation and removal of sand and other solids and associated gases promotes more efficient oil-water separation in downstream processes, adding to oil volumes and minimizing water pollution. The separation of solids from the oil and water mixture is typically done in so-called desanding tanks, which allow sand and other solids to settle while liquid components such as oil and water flow out of the tank.

Typical desanding tanks use gravity to settle solids from the oil and water liquids that are recovered from the ground. The efficiency and speed of separation is important in that it dictates the quality and speed of separation in an oil production operation.

BRIEF SUMMARY OF THE DISCLOSURE

In one aspect, the present disclosure describes a tank for removing sand entrained in a water flow. The tank includes a tank shell having a sidewall, a bottom, and a lid. The tank shell defines a tank interior. An inlet assembly is disposed within the tank interior. The inlet assembly has a hollow body in the form of a churn pipe, which includes a feed inlet fluidly connected to a feed chamber formed in an upper portion of the hollow body, the feed chamber and the feed inlet configured to impart motion in a fluid provided into the hollow body through the feed inlet; an apex outlet is disposed at a conical lower end of the churn pipe, the housing is configured to permit solids to separate from the fluid stream; and a base outlet is disposed within the hollow body and generally centrally with respect to the feed chamber. An oil outlet port communicates with an oil collection device, and a water outlet port communicates with a water outlet assembly.

In another aspect, the disclosure describes a method for removing entrained sand from a fluid flow, including providing the fluid flow into an inlet assembly. The inlet assembly includes a first churn tube and a second churn tube. The inlet assembly is disposed within a tank. The tank includes a tank shell including a sidewall, a bottom, and a lid. The tank shell defines a tank interior. A swirl is induced in the fluid flow within the first churn tube. Sand included in the fluid flow is allowed to fall towards a bottom of the tank interior through a first solids outlet. Gas included in the fluid flow is allowed to exit the first churn tube and enter the tank interior. The fluid flow is directed from the first churn tube into the second churn tube. A swirl in the fluid flow is induced within the second churn tube. Sand included in the fluid flow is allowed to fall towards a bottom of the tank interior through a second solids outlet. Gas included in the fluid flow is allowed to exit the second churn tube and enter the tank interior. Water and any oil included in the fluid flow is expelled from the second churn tube into the tank interior. Oil floating in an upper portion of the tank interior is collected and an oil flow is provided through an oil outlet port of the tank shell. Gas is allowed to vent from the tank interior through the tank shell. Water is collected from the tank interior and a water flow is provided at a water outlet port of the tank shell.

BRIEF DESCRIPTION OF THE SEVERAL VIEWS OF THE DRAWING(S)

DETAILED DESCRIPTION OF A PREFERRED EMBODIMENT

The present disclosure relates to tanks used to separate entrained components in fluids containing water, oil, gas and solids, which are produced during oil extraction operations. The present disclosure describes a particular embodiment for a sand removal tank, which advantageously is configured to remove finer silt and sand particles from a fluid flow than was previously generally possible, and to do so with greater speed and efficiency than tanks usually used in the industry.

Figure 1:
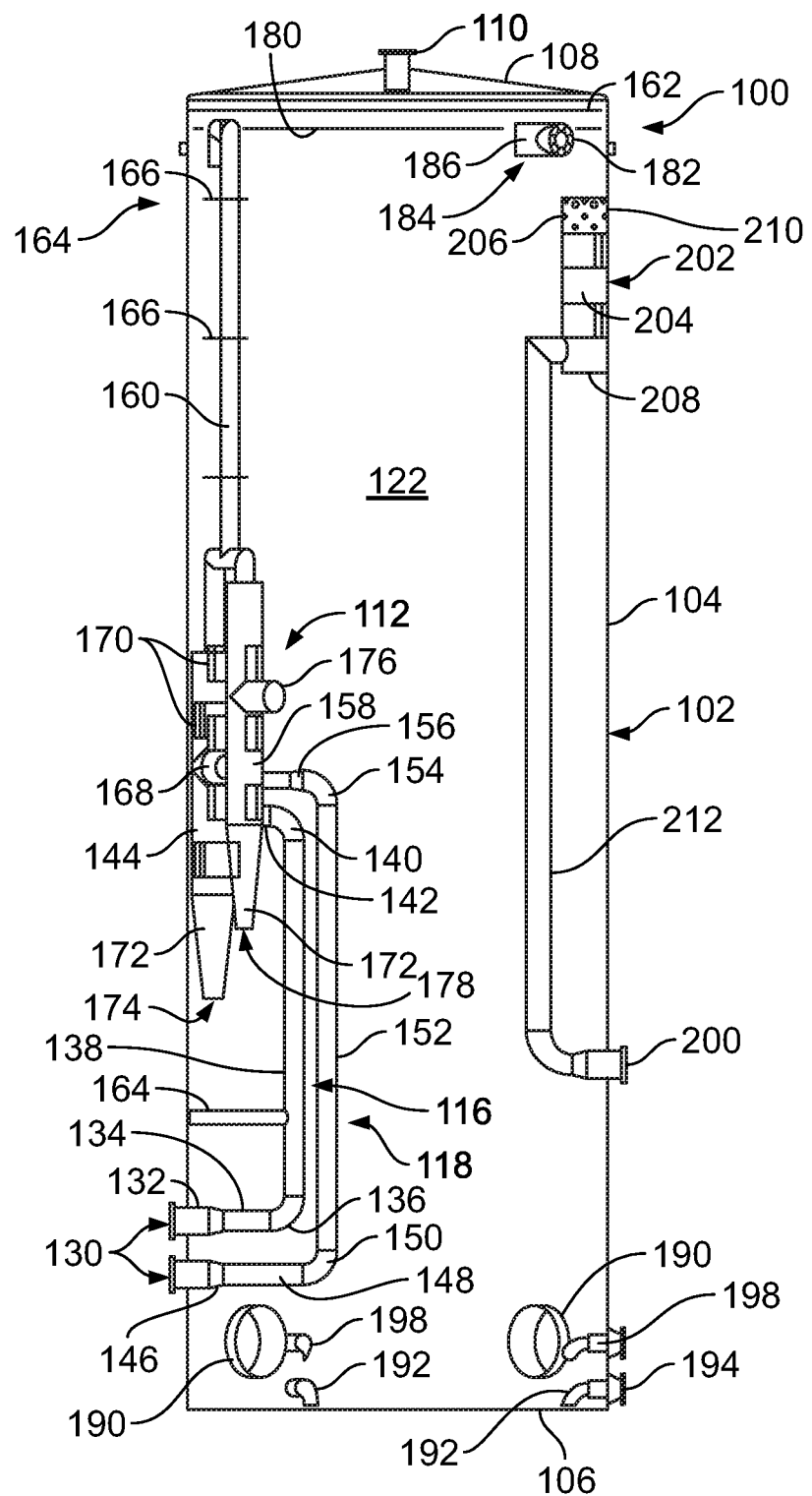
FIG. 1 is a partial side section view through a sand removal tank in accordance with the disclosure.

A tank 100 in accordance with the disclosure is shown in partial cross section in FIG. 1 from a side perspective. The tank 100 includes a shell 102 having a sidewall 104, a bottom 106 and a lid 108. In the illustrated embodiment, the shell 102 is generally cylindrical with a diameter of about 10 feet and a height of about 38 feet but other shapes and dimensions can be used. The shell 102 may be made from any desired or appropriate material including metal, plastic or a composite material such as fiberglass. In the embodiment shown, the tank 100 includes various liquid inlets and outlets in the sidewall 104 and a gas vent 110 in the lid 108. With respect to the liquid inlets and outlets, external piping (not shown) or individual pumps and/or fluid conduits can be connected to the tank 100 to operate or connect one or more fluid inlets, one or more clarified water outlets, one or more oil outlets and numerous other connections such as water jet inlets for fluffing and swirling sand settling to the bottom of the tank for removal, and also outlets used to collect and remove silt and sand settling to the bottom of the tank. One of each of these structures is shown and discussed below, but is should be appreciated that more than one similar structures can be used at the same time in the tank 100 depending on the flow rates and composition of the working fluid provided to the tank 100.

Figure 2:
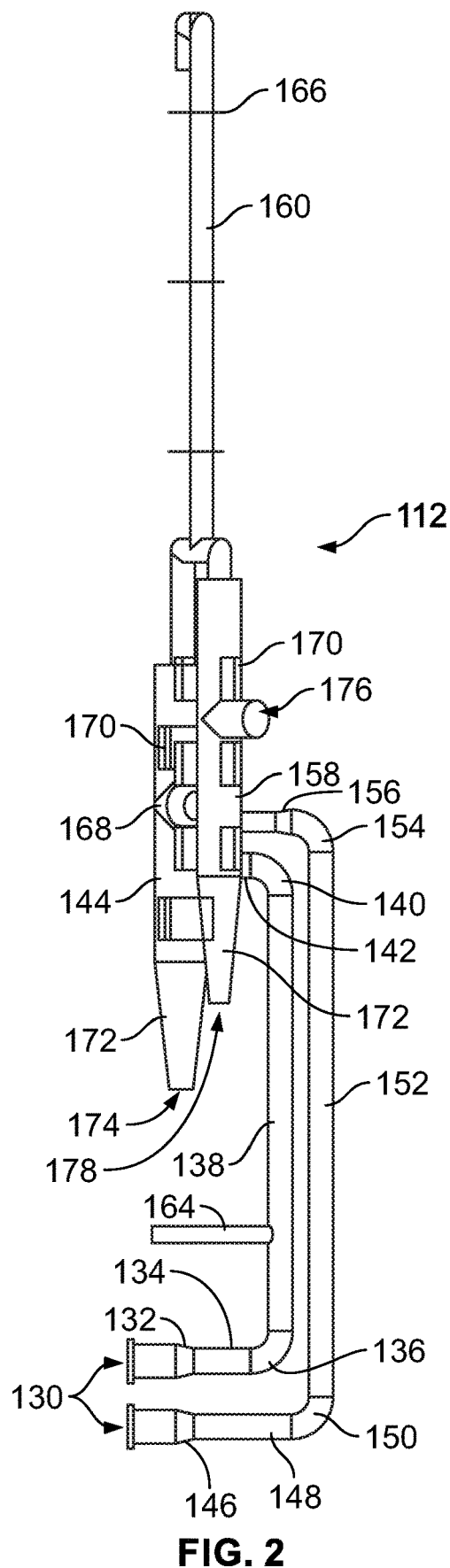
FIGS. 2-4 are enlarged detailed views of an inlet assembly of the sand removal tank shown in FIG. 1.
Figure 3:
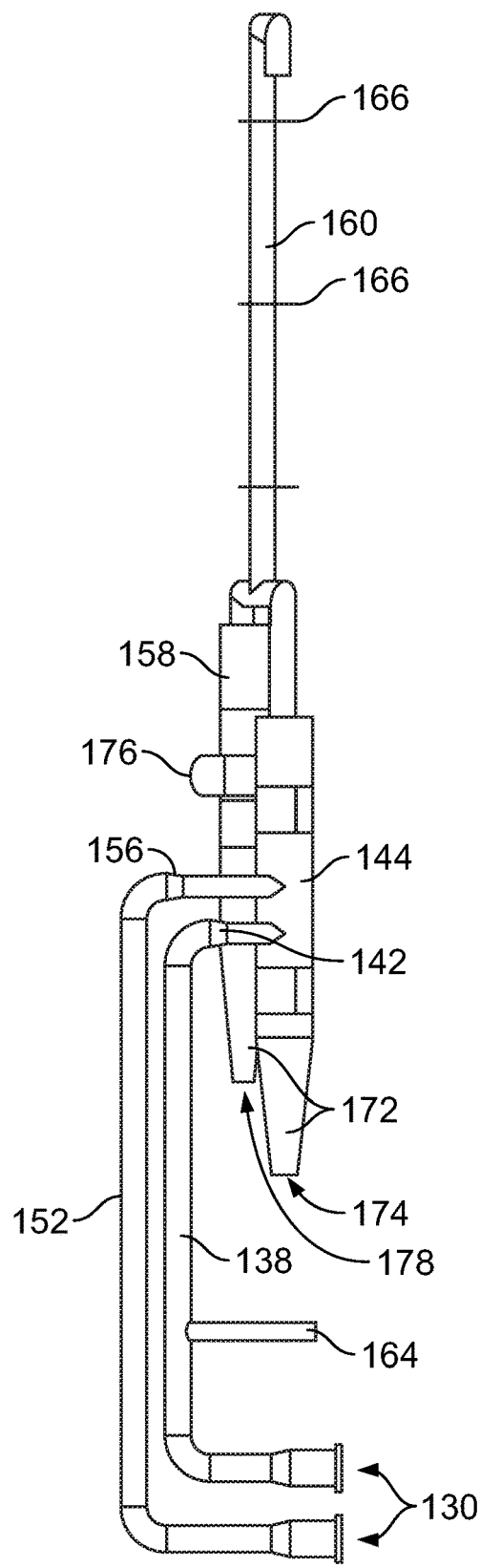
Figure 4:
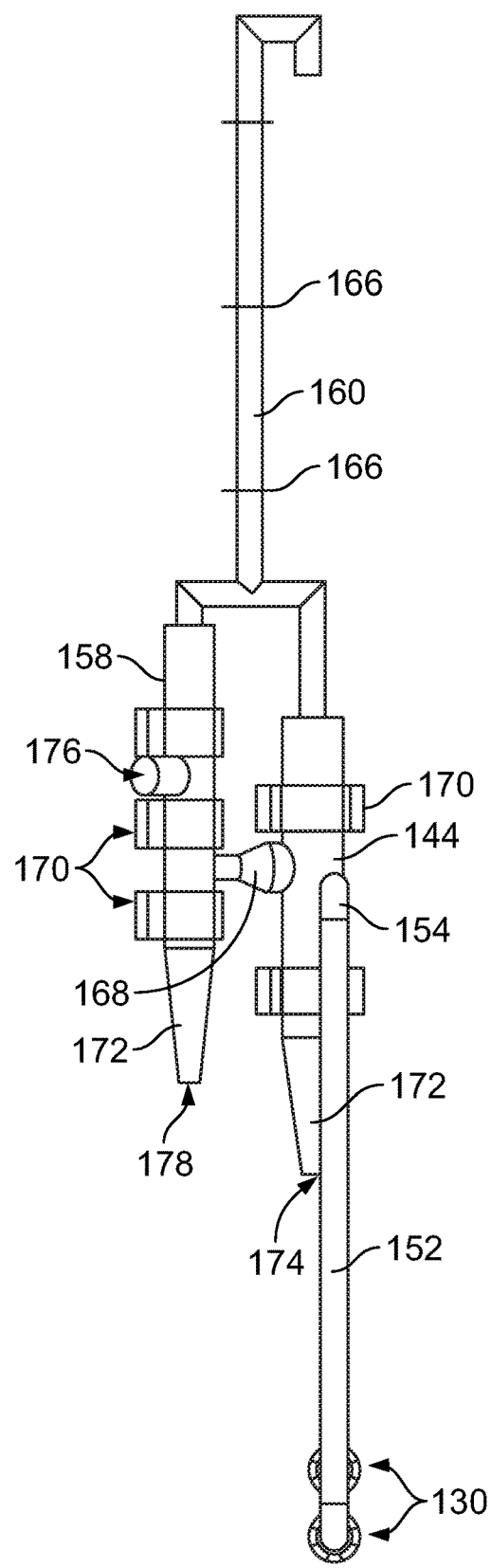

More specifically, the tank 100 includes one or more (one shown in FIG. 1 from a total of seven, as shown in FIG. 6) inlet assemblies 112. The inlet assembly 112 has the objective of separating fluids from the silt and sand and the like in an incoming fluid stream. The one or more inlet assemblies 112 are arranged in a parallel flow circuit configuration between a source or multiple sources of fluid provided to the tank and the interior 122 of the tank. Different perspectives of inlet assembly devices 112 are shown in FIGS. 2-4. In reference to these figures, each inlet assembly 112 includes a pair of churn pipes 144, 156 arranged in series.

The inlet assembly 112 includes one or more inlet ports 130. The embodiment shown includes a pair of inlet ports 130. A first one of the inlet ports 130 includes an inside port reducer 132 connected to the inlet port at one end and a bottom inside runner 134. The bottom inside runner 134 is connected to a bottom inside elbow 136. The bottom inside elbow 136 is connected to an inside riser 138, which is connected to a top inside elbow 140. The top inside elbow 140 is connected to a top inside reducer 142, which is connected to and directs inlet fluid into a first churn pipe 144, preferably tangentially or angularly so as to induce a swirl or other similar form of turbulent or circular flow within the central cylindrical portion of the churn pipe.

A second one of the inlet ports 130 includes an outside port reducer 146 connected to the inlet port at one end and a bottom outside runner 148. The bottom outside runner 148 is connected to a bottom outside elbow 150. The bottom outside elbow 150 is connected to an outside riser 152, which is connected to a top outside elbow 154. The top outside elbow 154 is connected to a top outside reducer 156, which is connected to and directs inlet fluid into the first churn pipe 144 at a position that is vertically higher than the inlet fluid entering the first churn pipe from the top inside reducer 142.

Inlet fluid enters the first churn pipe 144 at or near a midsection thereof. Gas from the inlet fluid is permitted to exit the churn pipe 144 at an upper end thereof via a degassing pipe 160, which extends vertically upwardly inside the tank 100 and terminates and opens into or near a headspace above an oil/gas interface 162 in the top portion 164 of the tank. Gas in the headspace exits the tank 100 through vent 110.

Clarified fluid, i.e., water and oil, for example, exits from the first churn pipe 144 via a first churn pipe fluid outlet 168. The first fluid outlet 168 directs fluid from the first churn pipe 144 into a second churn pipe 158. The first churn pipe 144 also includes a conical housing portion 172 disposed at a vertically lower portion of the churn pipe, and includes a solids outlet 174 that permits sand and silt and other materials that are heavier than water and oil, for example, to settle out of the churn pipe and fall downwardly within the tank 100.

The second churn pipe 158 operates similarly to the first, although since at least some separation of gas, fluid, and solids takes place in the first churn pipe 144, the second churn pipe has a different load or proportion of gas, fluids, and solids to separate from the incoming fluid stream. The second churn pipe 158 is constructed similarly to the first churn pipe 144, and is supplied with fluid flow from the outlet 168 of the first churn pipe. The second churn pipe 158 may be positioned vertically higher than the first churn pipe 144 such that the fluid outlet 168 is relatively high and solids are less likely to be moved into the second churn pipe.

The second churn pipe 158 includes connections to a degassing pipe 160, a fluid outlet 176 and a solids outlet 178. The degassing pipe 160 permits the exit of gases from inside the second churn pipe 158. The fluid outlet 176 directs fluid from inside the second churn pipe 158 to the interior 122 of the tank 100, which may be oriented so as to induce, in a tangential direction relative to the circular cross section of the sidewall 104, a swirl within the interior of the tank. The solids outlet 178 permits solids to settle out of the bottom of the second churn pipe 158.

One or both of the inside and outside risers 138, 152 may be supported by a sidewall pipe support 164 connecting the riser to the sidewall 104 of the tank 100. Also, the degassing pipe 160 may be fixed to the sidewall 104 by one or more degassing pipe supports 166. The first and second churn pipe 144, 158 is secured in position via one or more pipe straps 170.

Because of the shape of the churn pipes 144, 156 a rotation or agitation is imparted to fluids therewithin. The rotation of the fluids in the conical housing portion 172 helps move heavier particles such as sand and silt towards the wall of the tubes, from where the heavier particles migrate, by force of the developed whirling fluid and/or by force of gravity with the churn pipes mounted vertically, and towards the respective solids outlet 174, 178.

The tank 100 may include one or more inlet assemblies 112. During operation, the feed liquid provided to the inlet assembly 112 is separated into sand or silt, most of which exits through the solids outlets 174, 178 and settles towards a bottom portion 106 of the tank 100, and into mostly water and oil, which exit the fluid outlet 176 and which fill a middle portion of the tank 100. Lighter components such as gas and oil contained in the fluids rise in the tank 100. Gas may collect in a gas layer that occupies a topmost portion of the tank 100 above the gas/oil interface 162, and an oil layer that floats on the water contained in the tank and occupies a volume defined between an oil/water interface 180 and the gas/oil interface 162. Oil, water and sand can then be separately removed from the tank 100. Gas can be released or drawn from the tank through vent 110.

In the illustrated embodiment, oil is removed from the tank 100 through an oil outlet port 182, which is in fluid communication with an oil weir assembly 184. As shown, the oil weir assembly 184 is formed by a pipe section that is open on top and closed on the bottom such that a weir 186 is formed around a perimeter of the open top. The weir 186 is placed such that the open end of the pipe is open within the oil layer to allow oil, but not water, to enter the pipe through its open end and be collected so that it can be removed from the tank through the oil outlet port 182.

Depending on the amount of sand contained in the feed fluid, sand can be removed from the tank 100 either continuously or intermittently. In the case of intermittent removal, sand collecting on the bottom of the tank can be removed manually by placing the tank out of service and accessing its interior 122 through a manhole 190. Because such manual sand removal is time consuming and costly, intermittent removal of sand, along with some water, can also be accomplished through one or more sand withdrawal fixtures 192. The sand withdrawal fixtures 192, two of which can be seen in FIG. 1, can withdraw sand from the bottom 106 of the tank 100 and extract the sand, along with some water to keep the sand flowing, to a sand outlet port 194. The sand outlet port 194 may be connected to an inlet of a pump (not shown), which generates suction and draws off the sand to deposit the extracted sandy water to a catch basin, runoff pit or the like. The sand withdrawal fixtures 192 each are formed of tubing with an open end facing and adjacent the bottom 106 presenting a gap of a selected distance therebetween, whereby the suction generated and resulting flow velocity is of a sufficient force to extract solids from the bottom of the tank 100.

To increase the amount of sand that is collected by the sand withdrawal fixtures 192, sand fluffing jets 198 are provided in the lower portion of the tank 100. The sand fluffing jets 198 are water inlet pipes that are disposed at a downward angle with respect to horizontal and also at an angle with respect to a tank centerline. Water provided to the sand fluffing jets 198 is provided close to the bottom of the tank and at an angle to agitate the sand and silt that has settled at the bottom of the tank so it can more easily be suctioned through the sand withdrawal fixtures 192. Operation of the sand withdrawal fixtures 192, with or without the optional sand fluffing jets 198, may be carried out intermittently or continuously during tank operation.

Figure 5:
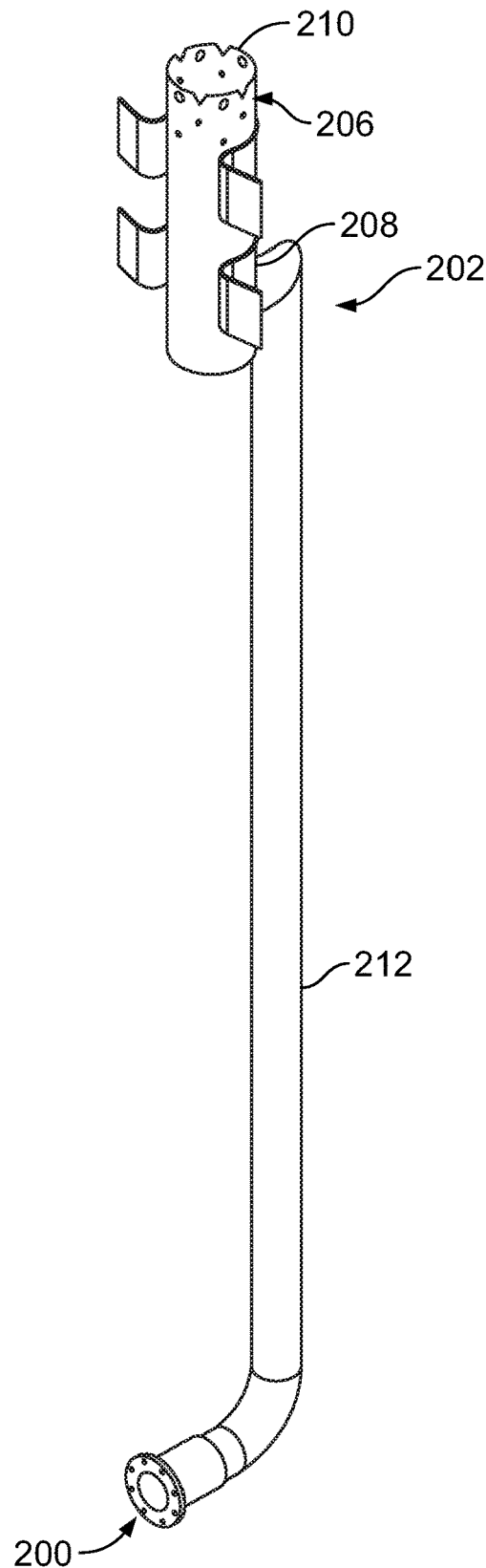
FIG. 5 is a perspective view of an outlet assembly shown in FIG. 1.

Water is removed from the tank 100 through a water outlet port 200, which is fluidly connected with a water outlet assembly 202. An enlarged detail view of the water outlet assembly 202 is shown in FIG. 5. The water outlet assembly 202 works to capture clarified water from the interior 122 of the tank 100 and provide an outflow of water through the water outlet port 200. The water outlet assembly 202 includes structures and features that provide adjustability to the flow of water from the tank, such that operation of the tank can accommodate a range of fluid entering the tank.

More specifically, the water outlet assembly 202 includes a hollow tubular structure having a sidewall 204 that is open at the top 206 and is attached to the outlet 200 at the closed bottom 208. The open top 206 extends vertically to a position below the oil/water interface 180 such that oil is precluded from entering the water outlet assembly. The sidewall 204 is provided with a plurality of openings 210 formed therethrough, with smaller diameter openings formed relatively vertically lower in the sidewall 204. In this way, the amount of water that enters through the openings 210 will change based on the height of the water level in the tank so that water being removed from the tank through multiple outlets can be equalized even if the tank if not installed on a perfectly level surface.

In the embodiment shown, the open top perimeter 206 includes triangular cutouts and acts as a weir to allow water to flow radially inward. Water entering the water outlet assembly 202 is conveyed via a conduit 212 to the water outlet port 200.

In use, the tank 100 functions to remove entrained sand from a fluid flow. The fluid flow is directed into an inlet assembly 112 disposed within the tank. The tank 100 includes a tank shell 102 with a sidewall 104, a bottom 106, and a lid 108 with the tank shell defining a tank interior. The inlet assembly 112 includes first and second churn tubes 144, 158. The fluid is agitated and/or caused to adopt a whirling motion in the interior space of the first churn tube 144. The fluid flow is separated in the first churn tube 144 by permitting the sand to exit the bottom of the churn tube where the sand settles toward the bottom 106. Gas is permitted to exit the first churn tube 144 via a degassing pipe 160 located at an upper end of the churn tube. The liquid parts of the fluid flow (oil and water) exit the first churn tube 144 via a first churn tube fluid outlet 168 include those solids and gas that are not separated from the fluid flow in the first churn tube. The first churn tube fluid outlet 168 directs the fluid flow from the first churn tube 144 to the second churn tube 158, in which a similar separation process takes place. The liquid parts of the fluid flow exit the second churn tube 158 via a fluid outlet 176. In accordance with an embodiment of the disclosure, oil floating in an upper portion of the tank interior 122 is collected, and an oil flow is provided through an oil outlet port 182 of the tank shell 102. Gas is allowed to vent through vent 110 of the tank shell 102, and water from the tank interior 122 is collected to provide a water flow at a water outlet port 200 of the tank shell.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. Terms of orientation or direction, such as "vertical" refer to elements as depicted in the figures assuming that the device is installed in a generally upright orientation as shown in FIG. 1.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A tank for removing sand entrained in a fluid flow, comprising:
   a tank shell including a sidewall, a bottom, and a lid, the tank shell defining a tank interior;
   an inlet assembly disposed within the tank interior, the inlet assembly comprising:
   a first churn tube and a second churn tube disposed within the tank interior and oriented generally vertically, each of the first and second churn tubes including a fluid connection to a common degassing pipe disposed within the tank interior at an upper end thereof to permit the exit of gas therefrom, the fluid connections from the upper end of each churn tube being in parallel, and a conical housing portion at a lower end thereof having a solids outlet to permit the exit of solids therefrom;
   wherein the first churn tube is fluidly connected to the fluid flow such that the fluid flow enters the first churn tube tangentially, the first churn tube configured to impart a swirl in the fluid flow, the first churn tube including a first fluid outlet disposed vertically between the fluid connection to the degassing pipe and the conical housing portion for permitting the exit of fluid therefrom;

wherein the second churn tube is fluidly connected in series to the first churn tube by the first fluid outlet and includes a second fluid outlet configured to direct fluid to the tank interior; and an oil weir configured to acquire oil from the tank interior, the oil weir in communication with an oil outlet port configured to convey the oil acquired by the oil weir to outside the tank interior; and a water outlet port communicating with a water outlet assembly configured to remove water from the tank interior.

2. The tank of claim 1, wherein the tank includes a plurality of inlet assemblies arranged in parallel circuit configuration between a source of liquid and the tank interior.

3. The tank of claim 1, wherein the first fluid outlet is disposed in the tank at an elevation relatively higher than the second fluid outlet.

4. The tank of claim 1, wherein the inlet assembly includes separate first and second inlet feeds configured to supply the fluid flow to the first churn tube.

5. The tank of claim 4, wherein the first and second inlet feeds are supplied the fluid flow by separate inlet ports.

6. The tank of claim 5, wherein the first and second inlet feeds each include at least one reducer.

7. The tank of claim 6, wherein the at least one reducer is disposed adjacent the first churn tube.

8. The tank of claim 6, wherein the at least one reducer is disposed adjacent the inlet ports.

9. The tank of claim 6, wherein the first and second inlet feeds supply the fluid flow at vertically spaced positions of the first churn tube.

10. The tank of claim 1, wherein rotation of the fluid flow in the conical housing portion moves heavier particles such as sand and silt towards a wall of the conical housing portion, from where the heavier particles migrate by force of the rotation and gravity towards the solids outlet.

11. The tank of claim 1, wherein the oil weir includes a pipe section that has an open top and a closed bottom such that a weir is formed around a perimeter of the open top, and wherein the weir is sufficiently high in the tank interior to allow oil, but not water, to enter.

12. The tank of claim 1, further comprising at least one sand withdrawal fixture disposed in a lower portion of the tank interior, the sand withdrawal fixture being configured to draw sand entrained with water from a bottom of the tank interior.

13. The tank of claim 12, wherein the sand withdrawal fixture is constructed as a downwardly facing open tube that operates to suction sand off the bottom of the tank interior when a suction is applied thereto.

14. The tank of claim 13, further comprising a plurality of sand fluffing jets disposed in the lower portion of the tank interior, each of the plurality of sand fluffing jets disposed at a downward angle with respect to horizontal and also at an angle with respect to a tank centerline and adapted to agitate sand and silt that has settled at the bottom of the tank.

15. The tank of claim 1, wherein the water outlet assembly is adapted to capture clarified water from a selected height in the tank interior and provide an outflow of water through the water outlet port.

16. The tank of claim 1, wherein the water outlet assembly includes a sidewall including a plurality of openings for permitting water to enter.

17. The tank of claim 16, wherein the plurality of openings in the water outlet assembly vary in diameter in accordance with the vertical height of the sidewall to adjust flow of water entering the water outlet assembly.

18. A method for removing entrained sand from a fluid flow, comprising:

providing the fluid flow into an inlet assembly, the inlet assembly including a first churn tube and a second churn tube, the inlet assembly disposed within a tank, the tank comprising a tank shell including a sidewall, a bottom, and a lid, the tank shell defining a tank interior;

inducing a swirl in the fluid flow within the first churn tube, allowing sand included in the fluid flow to fall towards a bottom of the tank interior through a first solids outlet, allowing gas included in the fluid flow to exit the first churn tube and enter the tank interior via a common degassing pipe disposed within the tank interior and connected to an upper end of the first churn tube, and directing the fluid flow from the first churn tube into the second churn tube connected in series with the first churn tube;

inducing a swirl in the fluid flow within the second churn tube, allowing sand included in the fluid flow to fall towards a bottom of the tank interior through a second solids outlet, allowing gas included in the fluid flow to exit the second churn tube and enter the tank interior via the common degassing pipe connected to the upper end of the second churn tube, fluid connections between the first churn tube and the second churn tube with the being in parallel; and expelling water and any oil included in the fluid flow from the second churn tube into the tank interior;

collecting oil floating in an upper portion of the tank interior and providing an oil flow through an oil outlet port of the tank shell;

allowing gas to vent from the tank interior through the tank shell; and collecting water from the tank interior and providing a water flow at a water outlet port of the tank shell.

19. The tank of claim 1, wherein the second fluid outlet is oriented to direct fluid toward the sidewall tangentially.

* * * * *

UNITED STATES PATENT AND TRADEMARK OFFICE
CERTIFICATE OF CORRECTION

| | |
|---|---|
| PATENT NO. | : 11,173,424 B2 |
| APPLICATION NO. | : 16/669904 |
| DATED | : November 16, 2021 |
| INVENTOR(S) | : White et al. |

It is certified that error appears in the above-identified patent and that said Letters Patent is hereby corrected as shown below:

On the Title Page

Inventor 2, item (72) the surname "Mueller" should read --Muller--

Signed and Sealed this
Eighth Day of February, 2022

Drew Hirshfeld
*Performing the Functions and Duties of the
Under Secretary of Commerce for Intellectual Property and
Director of the United States Patent and Trademark Office*